Dec. 21, 1948.     J. D. CAMPBELL ET AL     2,457,031
AIRCRAFT ANTIICING ARRANGEMENT
Filed Dec. 5, 1942
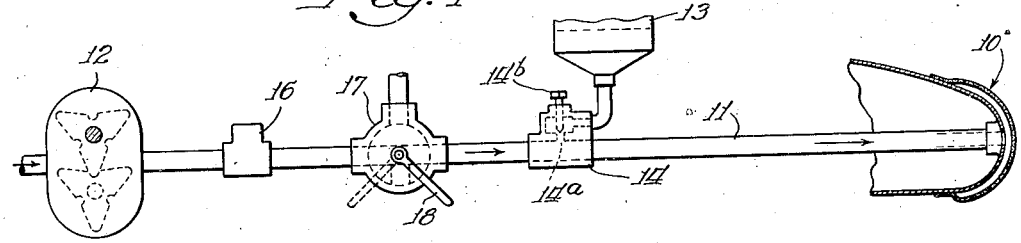
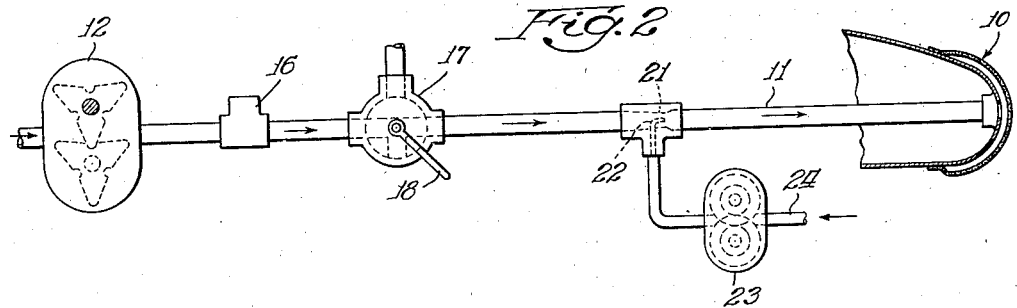
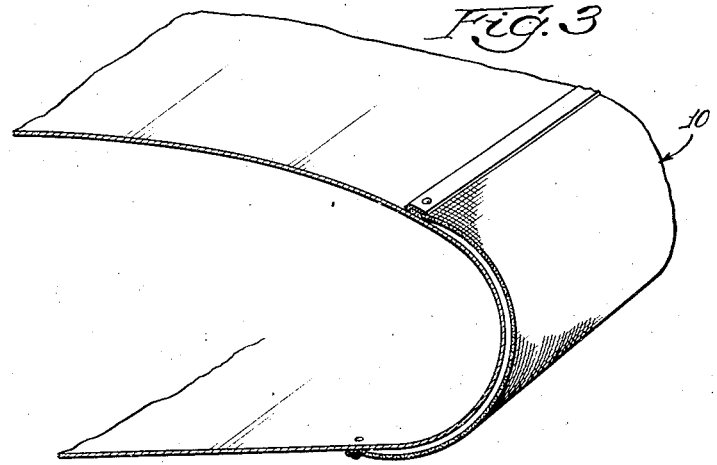
Inventors:
John D. Campbell and
Jay M. Roth.
By Edward C. Gritzbaugh
Atty.

Patented Dec. 21, 1948

2,457,031

UNITED STATES PATENT OFFICE 2,457,031

AIRCRAFT ANTI-ICING ARRANGEMENT

John D. Campbell, Lakewood, and Jay M. Roth, Euclid, Ohio, assignors, by mesne assignments, to Borg-Warner Corporation, Chicago, Ill., a corporation of Illinois Application December 5, 1942, Serial No. 467,958

1 Claim. (Cl. 244—134)

This invention relates to arrangements for solving the problem of ice formation on the leading surfaces of aircraft.

It is an object to provide an improved arrangement for preventing or limiting the formation of ice on the leading surfaces of aircraft as well as for effecting the removal of such ice formations therefrom. Arrangements intended to solve this problem have been proposed heretofore; however, the present solution is deemed to be an important improvement in the combination of means employed and the mode of operation thereof.

It is a more particular object to provide a novel arrangement of means for forming an effective anti-icing and de-icing medium and delivering the same through a porous leading surface of an aircraft in a manner that will most effectively limit the formation of ice thereon as well as accomplish the removal of any ice that may have formed thereon.

Other and more particular objects, advantages and uses of the present invention will become apparent from a reading of the following specification taken in connection with the accompanying drawing which forms a part thereof and wherein:

Fig. 1 shows an assembly associated with the leading surface of an airplane wing and embodying one preferred form of the present invention;

Fig. 2 is a view similar to Fig. 1 showing an alternative form of the invention; and Fig. 3 is an enlarged broken-away view of an aircraft wing showing one arrangement of the porous shoe or leading surface structure through which the anti-icing or de-icing medium is passed.

Referring in greater detail to the embodiment of the present invention shown in Fig. 1 of the drawing, by way of example, it will appear that basically the present invention includes the provision of a porous leading edge or surface structure indicated generally at 10 forming part of an aircraft on which, under freezing conditions, ice tends to collect and through which surface in accordance with the present invention a specially formed anti-icing and de-icing medium is passed. The particular arrangement disclosed in Fig. 1, by way of example of a preferred embodiment of means for forming the de-icing medium and delivering the same to the porous leading edge 10, includes a conduit 11, a dry air pump 12, an elevated tank 13 containing a supply of anti-icing or de-icing fluid, such as alcohol, arranged to be metered at a predetermined rate of flow into the conduit 11 and into contact with the air passing therethrough, by means of a suitable metering device 14 comprising inlet port 14a and adjustable metering pin 14b. A relief valve 16 prevents excessive pressure and a by-pass control valve 17 including a manual control handle 18 provides for selectively delivering the output air from pump 12 through the portion of conduit 11 leading to the porous surface 10 or alternatively bypassing the same.

In operation with the manual control lever 18 in the position shown in Fig. 1, the dry air pump 12 moves air through the conduit 11 and forces the same through the small or minute perforations in the leading surface 10. This air will, by virtue of the mechanical action thereof in passing through the porous surface 10, perform a limited anti-icing and de-icing function. In order to facilitate and materially increase this anti-icing and de-icing function alcohol or other suitable liquid is introduced into the air stream passing through conduit 11 by means of metering device 14 with the result that the liquid is mixed with the air and carried thereby to the back side of the porous leading surface structure 10 and passed therethrough with the air, which has been found to greatly facilitate the distribution and the passage of the fluid through the porous structure. In other words, this mixture of de-icing liquid and air effected by bringing the two together before introducing the same to the back side of the leading surface has been found to produce unusually satisfactory and improved results.

In the broader aspects of this invention, the same comprehends any equivalent arrangement which includes essentially, means providing an air stream delivered to a porous leading surface of an aircraft in combination with means for delivering anti-icing or de-icing fluid into the air stream, the air acting as a carrier. In the more specific aspects of the invention, preferred embodiments of which are shown in the drawings, it has been found that particularly improved results are obtained by the specific arrangement which includes introducing the anti-icing or de-icing fluid into the relatively high pressure portion of the air stream or outlet side of the air pump where such pump is employed as the pressure producing means.

It will be understood that there is necessarily present in the operation of an installation of the present character both prevention of ice formation and removal of ice after the same has formed. The first is properly referred to as an anti-icing and the latter as de-icing; however, since, as above pointed out, both operations are present, it is to be understood that the use of either term in the specification and claims contemplates both actions.

In Fig. 2 there is disclosed an alternative arrangement for delivering the liquid to the conduit 11 which comprises a restricted venturi-like portion 21 into the central portion of which a discharge nozzle 22 delivers the anti-icing or de-icing liquid from a suitable source (not shown), the movement of the liquid being effected by means of a gear type metering pump 23 through a conduit 24.

An installation built in substantial accordance with the arrangement disclosed and described in Fig. 1 has been flown and tested under the most severe conditions and with very gratifying results. While any suitable material that is available may be used as the porous structure 10 in the above installation, porous bronze sheet metal was employed with very satisfactory results.

Also while dry air pump 12 as well as gear metering pump 23 may be driven by any source of power available, it has been found that the same operate quite satisfactorily when driven by separate electric motors (not shown).

While our invention has been disclosed in connection with certain specific embodiments thereof, it will be understood that this is by way of example rather than by way of limitation and that the same is to be defined by the appended claim which should be given a scope as broad as permitted by the prior art.

We claim:

In an aircraft anti-icing or de-icing arrangement, means defining a porous leading surface subject to the formation of ice thereon under low temperature flying conditions, means effective to form and deliver a mixture of air and anti-icing or de-icing fluid to the back side of said leading surface for continuous passage therethrough, said means including a conduit leading to the area adjacent the back side of said leading surface, means for moving air through said conduit to the back side of said leading surface comprising a rotary dry air pump, means providing a supply of anti-icing or de-icing fluid, means for introducing said fluid into said conduit at a point therein, in the travel of said air from the outlet of said dry air pump to the back side of said leading surface, said introducing means comprising means defining a Venturi-like restriction or throat in said conduit, a discharge nozzle extending through the wall of said conduit with the discharge terminal portion thereof disposed centrally of said restricted Venturi portion of said conduit, and means for supplying said fluid to said nozzle including a gear metering pump.

JOHN D. CAMPBELL.
JAY M. ROTH.

REFERENCES CITED

The following references are of record in the file of this patent:

UNITED STATES PATENTS

| Number | Name | Date |
|---|---|---|
| 1,749,858 | Toomey et al | Mar. 11, 1930 |
| 1,924,122 | Jones | Aug. 29, 1933 |
| 1,957,075 | Morgensen | May 1, 1934 |
| 2,249,940 | Bulloch | July 22, 1941 |
| 2,328,079 | Goodman | Aug. 31, 1943 |
| 2,422,746 | Patterson | June 24, 1947 |

FOREIGN PATENTS

| Number | Country | Date |
|---|---|---|
| 554,774 | France | Mar. 9, 1923 |
| 518,463 | Great Britain | Feb. 28, 1940 |